US010936048B2

(12) United States Patent
Furman et al.

(10) Patent No.: US 10,936,048 B2
(45) Date of Patent: Mar. 2, 2021

(54) SYSTEM, APPARATUS AND METHOD FOR BULK REGISTER ACCESSES IN A PROCESSOR

(71) Applicant: Intel Corporation, Santa Clara, CA (US)

(72) Inventors: Ben Furman, Kfar-Saba (IL); Yoni Aizik, Haifa (IL); Robert P. Adler, Santa Clara, CA (US); Robert Hesse, Santa Clara, CA (US); Chen Ranel, Shoham (IL)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 16/369,113

(22) Filed: Mar. 29, 2019

(65) Prior Publication Data

US 2019/0286223 A1 Sep. 19, 2019

(51) Int. Cl.

| | |
|---|---|
| ***G06F 1/00*** | (2006.01) |
| ***G06F 1/3296*** | (2019.01) |
| ***G06F 15/78*** | (2006.01) |
| ***G06F 9/30*** | (2018.01) |
| ***G06F 1/3287*** | (2019.01) |

(52) U.S. Cl.

CPC .......... *G06F 1/3296* (2013.01); *G06F 1/3287* (2013.01); *G06F 9/3013* (2013.01); *G06F 15/7807* (2013.01)

(58) Field of Classification Search

CPC .... G06F 1/3287; G06F 1/3296; G06F 9/3013; G06F 13/14; G06F 15/163; G06F 15/7807

See application file for complete search history.

(56) References Cited

U.S. PATENT DOCUMENTS

| | | | |
|---|---|---|---|
| 8,711,875 | B2 | 4/2014 | Lakshmanamurthy et al. |
| 8,713,234 | B2 | 4/2014 | Lakshmanamurthy et al. |
| 8,713,240 | B2 | 4/2014 | Lakshmanamurthy et al. |
| 8,775,700 | B2 | 7/2014 | Lakshmanamurthy et al. |
| 8,805,296 | B2 | 8/2014 | Lakshmanamurthy et al. |
| 8,874,976 | B2 | 10/2014 | Lakshmanamurthy et al. |
| 8,929,373 | B2 | 1/2015 | Lakshmanamurthy et al. |
| 8,930,602 | B2 | 1/2015 | Lim et al. |
| 9,021,156 | B2 | 4/2015 | Nimmala et al. |
| 9,053,251 | B2 | 6/2015 | Adler et al. |
| 2013/0083798 | A1 | 4/2013 | Lakshmanamurthy et al. |

(Continued)

OTHER PUBLICATIONS

European Patent Office, European Search Report dated Sep. 11, 2020 in European patent application No. 20156721.1, 9 pages total.

(Continued)

*Primary Examiner* — Nitin C Patel
(74) *Attorney, Agent, or Firm* — Trop, Pruner & Hu, P.C.

(57) ABSTRACT

In one embodiment, an apparatus includes a bulk write circuit to generate a bulk write message to send to a destination agent to cause the destination agent to write data comprising register contents into a plurality of registers, at least some of the plurality of registers comprising non-consecutive registers. The bulk write message may include a first message header, a first chunk header including an address of a first register of a first subset of the plurality of registers, and a first payload portion having the register contents for the first subset of the plurality of registers. Other embodiments are described and claimed.

19 Claims, 17 Drawing Sheets

(56) References Cited

U.S. PATENT DOCUMENTS

| | | | |
|---|---|---|---|
| 2015/0199290 | A1 | 7/2015 | Mathewson et al. |
| 2016/0224090 | A1 | 8/2016 | Gendler et al. |
| 2018/0219797 | A1 | 8/2018 | Sen et al. |
| 2019/0041969 | A1 | 2/2019 | Nge et al. |

OTHER PUBLICATIONS

Abhinav Vishnu et al., "Designing Scalable PGAS Communication Subsystems on Cray Gemini Interconnect," High Performance Computing (HIPC), 2012, 10 pages total.

200

| DW | L7 | L6 | L5 | L4 | L3 | L2 | L1 | L0 |
|---|---|---|---|---|---|---|---|---|
| Msg Header 0 | Destination ID | | | | | | | |
| | Source ID | | | | | | | |
| | Opcode = 8'h09 | | | | | | | |
| | EH=1 | addrien = 0 | | bar | | tag | | |
| Msg Header 1 | EH=0 | ExpHdrID = 7'h00 | | | | | | |
| | SAI[7:0] | | | | | | | |
| | Reserved | | | | | | | |
| | Reserved | | | | RS | | | |
| Chunk 0 Header | data length <wbr>[7:0] | | | | | | | |
| | fid [7:0] | | | | | | | |
| | address [7:2] | | | | | | space [1:0] | |
| | address [15:8] | | | | | | | |
| Payload DW 0 | data byte <wbr>[7:0] | | | | | | | |
| | data byte <wbr>[15:8] | | | | | | | |
| | data byte <wbr>[23:16] | | | | | | | |
| | data byte <wbr>[31:24] | | | | | | | |
| ... | ... | | | | | | | |
| Payload DW N | data byte <wbr>[N32+7:*N32*] | | | | | | | |
| | data byte <wbr>[ N32+15:*N32*+8] | | | | | | | |
| | data byte <wbr>[ N32+23:*N32*+16] | | | | | | | |
| | data byte <wbr>[ N32+31:*N32*+24] | | | | | | | |
| Chunk M Header | data length <wbr>[7:0] | | | | | | | |
| | fid[7:0] | | | | | | | |
| | address[7:2] | | | | | | space[1:0] | |
| | address [15:8] | | | | | | | |
| Payload DW 0 | data byte <wbr>[7:0] | | | | | | | |
| | data byte <wbr>[15:8] | | | | | | | |
| | data byte <wbr>[23:16] | | | | | | | |
| | data byte <wbr>[31:24] | | | | | | | |
| ... | ... | | | | | | | |
| Payload DW N | data byte <wbr>[N32+7:*N32*] | | | | | | | |
| | data byte <wbr>[ N32+15:*N32*+8] | | | | | | | |
| | data byte <wbr>[ N32+23:*N32*+16] | | | | | | | |
| | data byte <wbr>[ N32+31:*N32*+24] | | | | | | | |

FIG. 16

| DW | L7 | L6 | L5 | L4 | L3 | L2 | L1 | L0 |
|---|---|---|---|---|---|---|---|---|
| Msg Header 0 | Destination ID | | | | | | | |
| | Source ID | | | | | | | |
| | Opcode = 8'h08 | | | | | | | |
| | EH=1 | addrien = 0 | bar | | | tag | | |
| Msg Header 1 | EH=0 | ExpHdrID = 7'h00 | | | | | | |
| | SAI[7:0] | | | | | | | |
| | Reserved | | | | | | | |
| | Reserved | | | | | RS | | |
| Chunk 0 | data length <wbr>[7:0] | | | | | | | |
| | fid [7:0] | | | | | | | |
| | address [7:2] | | | | | | space [1:0] | |
| | address [15:8] | | | | | | | |
| ... | ... | | | | | | | |
| Chunk M | data length <wbr>[7:0] | | | | | | | |
| | fid[7:0] | | | | | | | |
| | address[7:2] | | | | | | space[1:0] | |
| | address [15:8] | | | | | | | |

FIG. 17

SYSTEM, APPARATUS AND METHOD FOR BULK REGISTER ACCESSES IN A PROCESSOR

TECHNICAL FIELD

Embodiments relate to accessing registers in a processor.

BACKGROUND

In many processors, cores and other processing circuits perform operations on data stored locally in registers or other internal temporary storage locations. To read or write register contents outside of the processing circuit, various communication protocols provide for register read and write flows. Typically these flows are arranged such that only the contents of a single register is read or written for a single corresponding read or write operation. Such communication via a packet-based fabric may consume relatively large amounts of overhead, as each register access packet includes header information for routing, as well as identifying the packet type and other information. In some protocols this register access overhead can reduce fabric efficiency in an undesired manner. Such overheads are further exacerbated by the fact that a core or other processing circuit may include many registers that are not located at incremental address locations, inhibiting use of some type of incremental access to multiple registers.

BRIEF DESCRIPTION OF THE DRAWINGS

FIG. 16 is an illustration of a format of a bulk write message in accordance with an embodiment of the present invention.

FIG. 17 is an illustration of a format of a bulk read message in accordance with an embodiment of the present invention.

DETAILED DESCRIPTION

Figure 1:
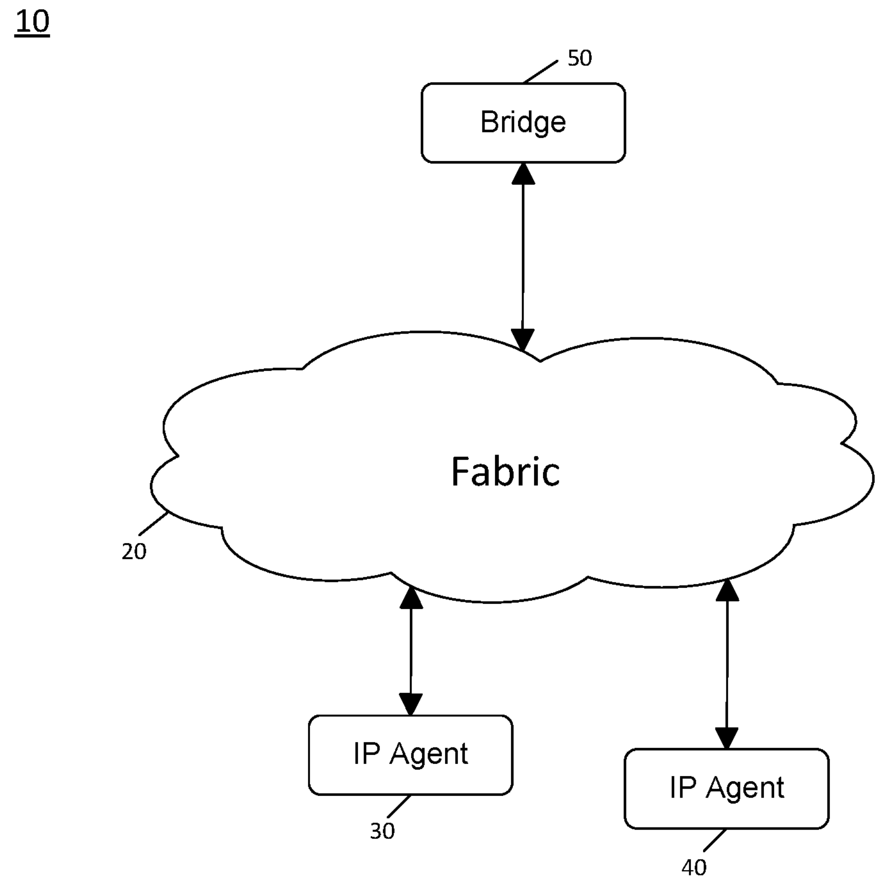
FIG. 1 is a block diagram of a basic interconnect architecture in accordance with an embodiment of the present invention.

In various embodiments, a communication protocol is enhanced by providing protocol messages that enable multiple registers to be accessed with a single message. Such accesses include read and write accesses to multiple registers. In fact in some cases, a single register read message or register write message may be used to read or write a large number of registers, including some registers that are located at consecutive or incremental addresses, as well as other registers that are non-incrementally located.

In particular embodiments described herein, a communication protocol is provided with a bulk read message, a bulk write message, and a bulk read completion message. Each of these messages may include a single header and multiple portions, where each of these portions is associated with some subset of registers that have incremental addresses. In this way, all or substantially all register context of a core or other processing circuit can be read or written with a single protocol message, vastly reducing the amount of overhead involved in communicating such context between different agents. And in this way, these message types optimize bus utilization for register accesses. While embodiments herein are described in the context of a multicore processor or other system on chip (SoC) and more specifically to communication between on-chip agents of such devices, understand the scope of the present invention is not limited in this regard. Further, understand while a particular embodiment described herein is with regard to a communication protocol for use on a sideband interconnect system, embodiments apply equally to primary communication channels.

In an embodiment, a bulk write message has the following properties: the message has a dedicated opcode (different from other register writes due to the different format of the message); the message contains a list of register addresses and data; the addresses are compacted so adjacent addresses are described by a base address and a register count; a block of adjacent addresses is referred to as a chunk, and the properties in the message header are applied to all registers that follow. In turn, a destination agent parses the message and converts it to multiple register accesses. A bulk write message can be either posted or non-posted. The completion to a non-posted bulk write message is a standard completion without data.

In an embodiment, a bulk read message has the following properties: the message has a dedicated opcode (different from other register reads due to the different format of the message); the message contains a list of register addresses; the addresses are compacted so adjacent addresses are described by a base address and a register count; and the properties in the message header are applied to all registers that follow. In turn, a destination agent parses the message and converts it to multiple register accesses. The message receiver returns the required data as a completion with data message.

With embodiments, the efficiency factor of data communication as compared to overhead on a packet-based fabric is greatly increased. In this way, in some cases the overhead portion of a packet communication becomes negligible in relation to the data content. As an example, when used in a packet-based fabric to communicate save/restore context of a core for low power state entry and exit, latency may be reduced between two and four times. In this way, greater opportunities for power savings can be realized, in light of such reduced latencies. Furthermore, understand that the latency reductions and concomitant power reductions may be realized while maintaining a given fabric width. That is, rather than increasing bandwidth by increasing fabric width (which can increase cost, routing complexity and power consumption), a native width of a given communication protocol may be maintained and increased efficiency realized.

Embodiments can be used in many different types of systems. As examples, implementations described herein may be used in connection with semiconductor devices such as processors or other semiconductor devices that can be fabricated on a single semiconductor die. In particular implementations, the device may be a SoC or other advanced processor or chip set that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Referring now to FIG. 1, shown is a block diagram of a basic interconnect architecture in accordance with an embodiment of the present invention. As shown in FIG. 1, system 10 may be a portion of an SoC or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
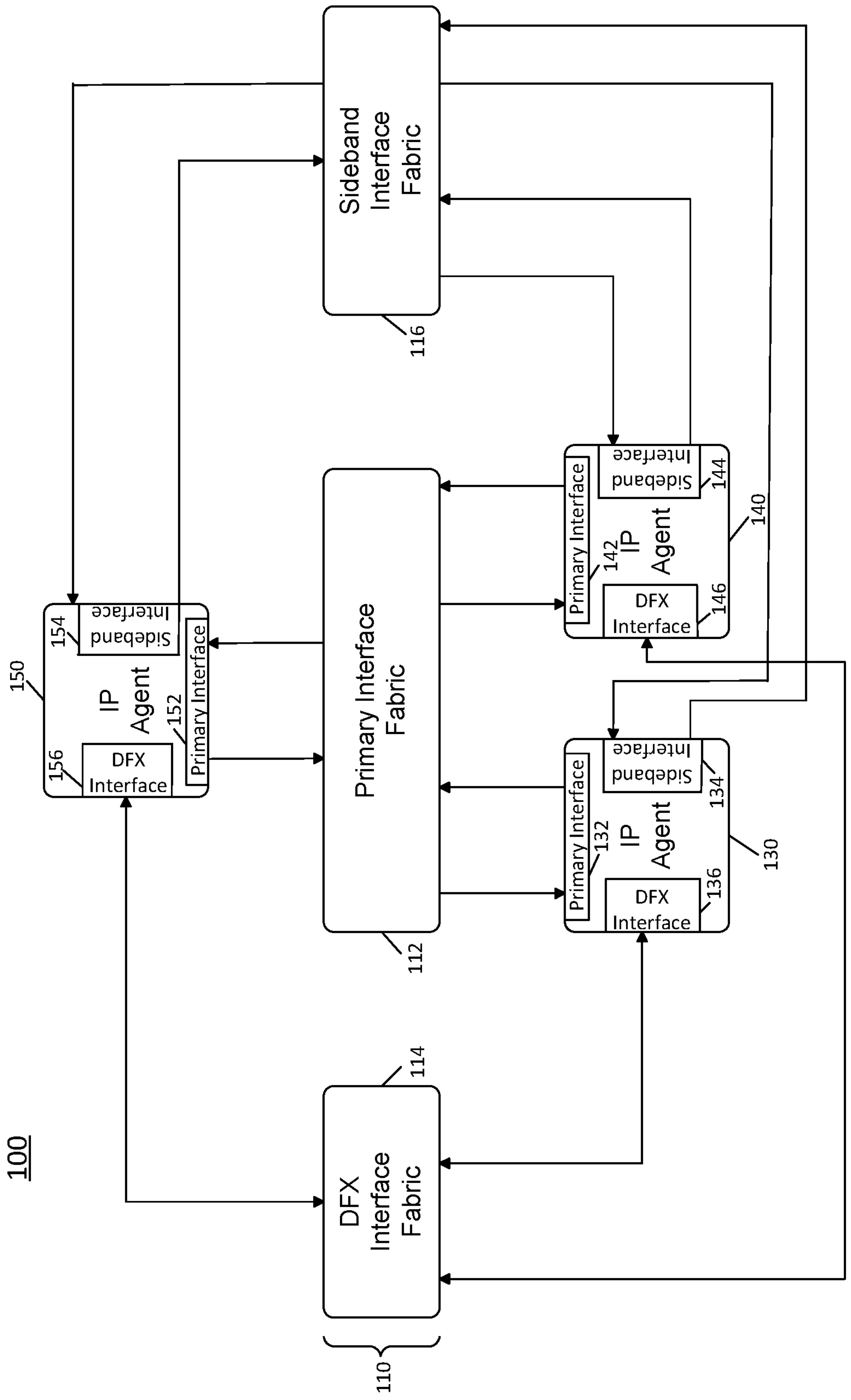
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
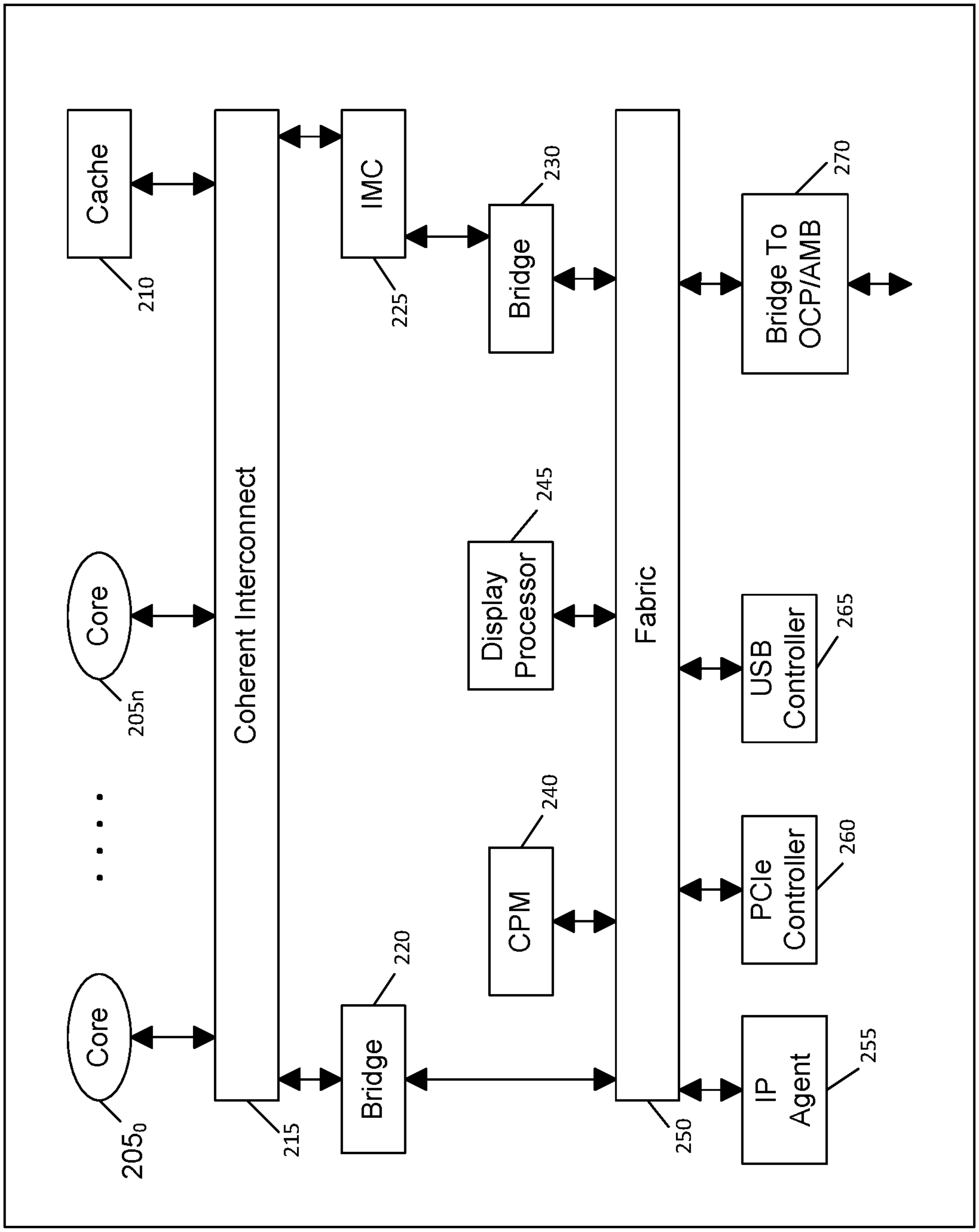
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores 205$_0$-205$_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
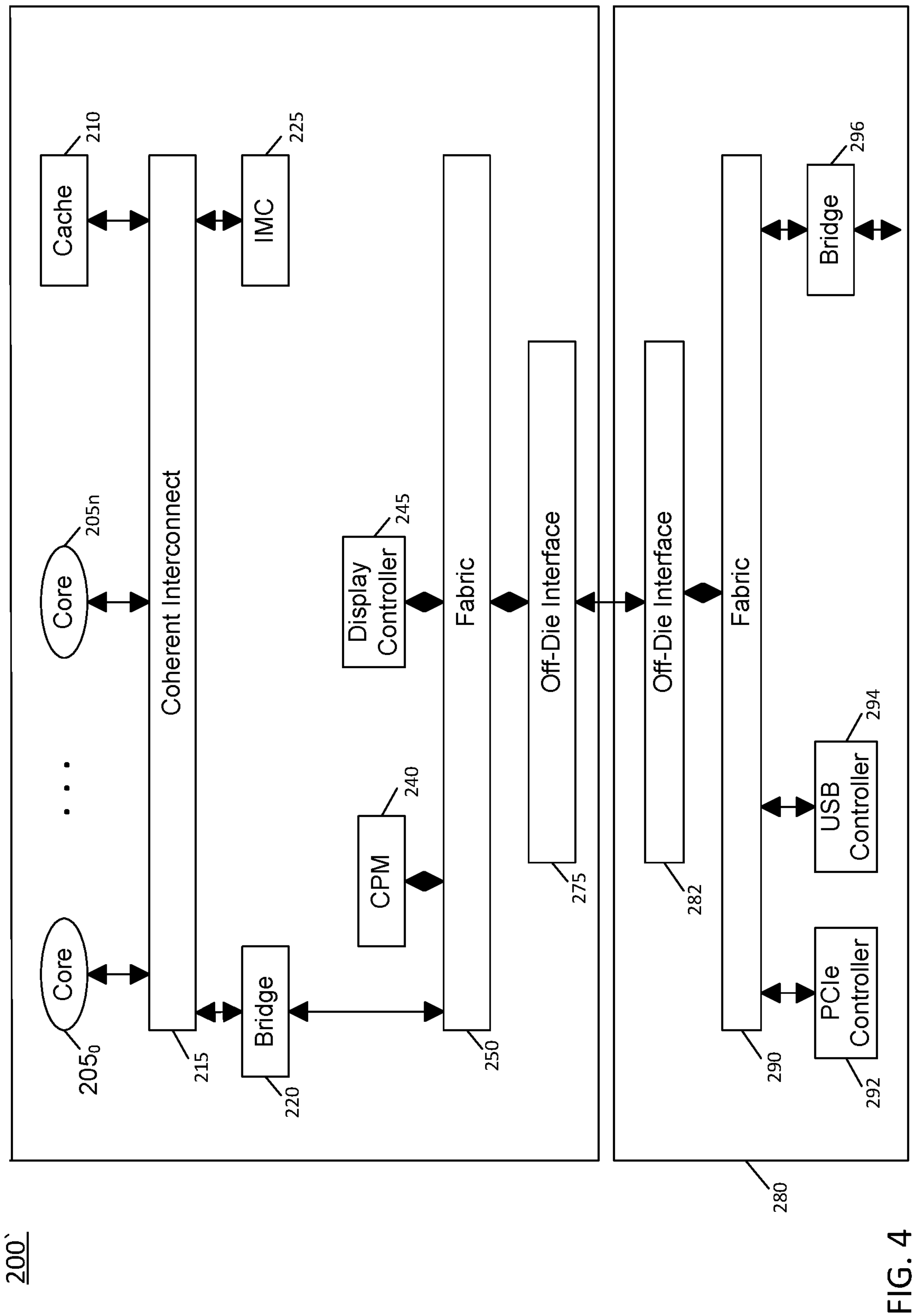
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
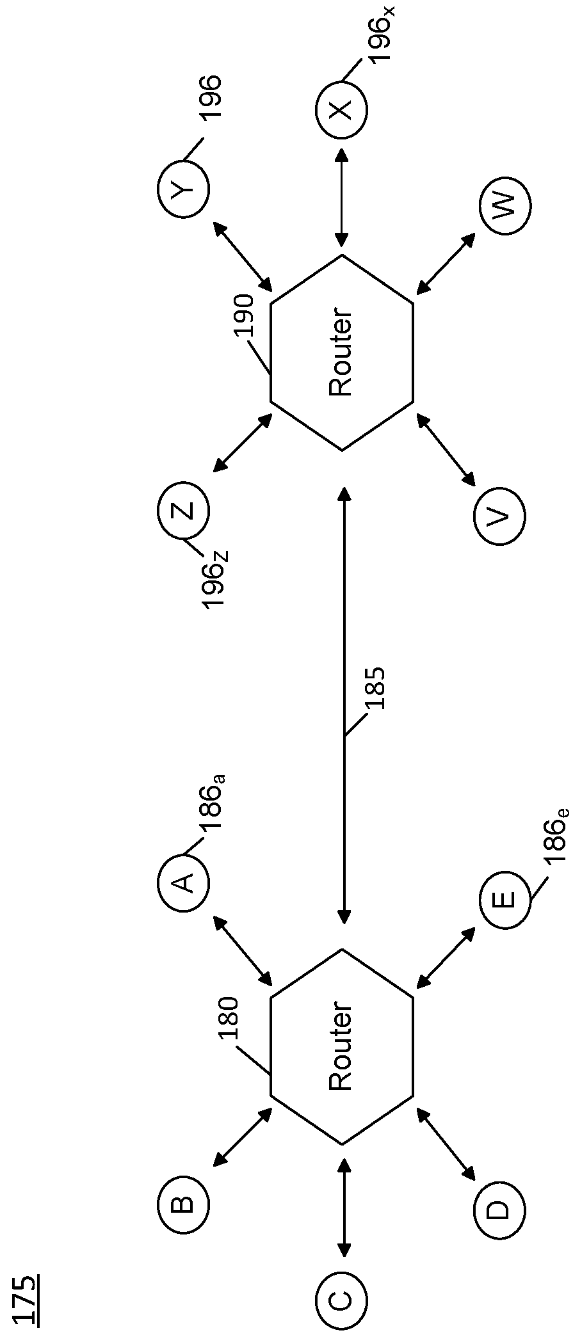
FIG. 5 is a block diagram of a sideband interconnection in accordance with an embodiment of the present invention.

As discussed above, in various embodiments out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints **186*a*-186*e* and router 190 couples to a plurality of endpoints 196*x*-196*z***.

In various implementations, sideband messages including bulk read and write messages as described herein may carry additional header information in one or more expanded headers. As used herein the term "additional header information" is used to refer to greater amounts of information (and potentially of different types) and/or different arrangement than information present in a standard header according to a given interface specification. In one embodiment, each expanded header can be a length of a conventional header, which in the embodiment described herein is one double word (DW) in length. The number of expanded headers in a message can be product specific. Different agents in a system may initiate messages expanded with a different number of expanded headers. To identify the presence of an expanded header, in some embodiments an expanded header (EH) indicator, e.g., a single bit, can be present in the standard header of every message to indicate the presence of an optional expanded header, namely the addition of another header of the standard header length. In turn, an EH indicator in every expanded header indicates the presence of a subsequent expanded header of the standard header length. If present, one or more expanded headers can be appended after the standard header (e.g., after the first DW in a system having a DW standard header length).

Figure 6:
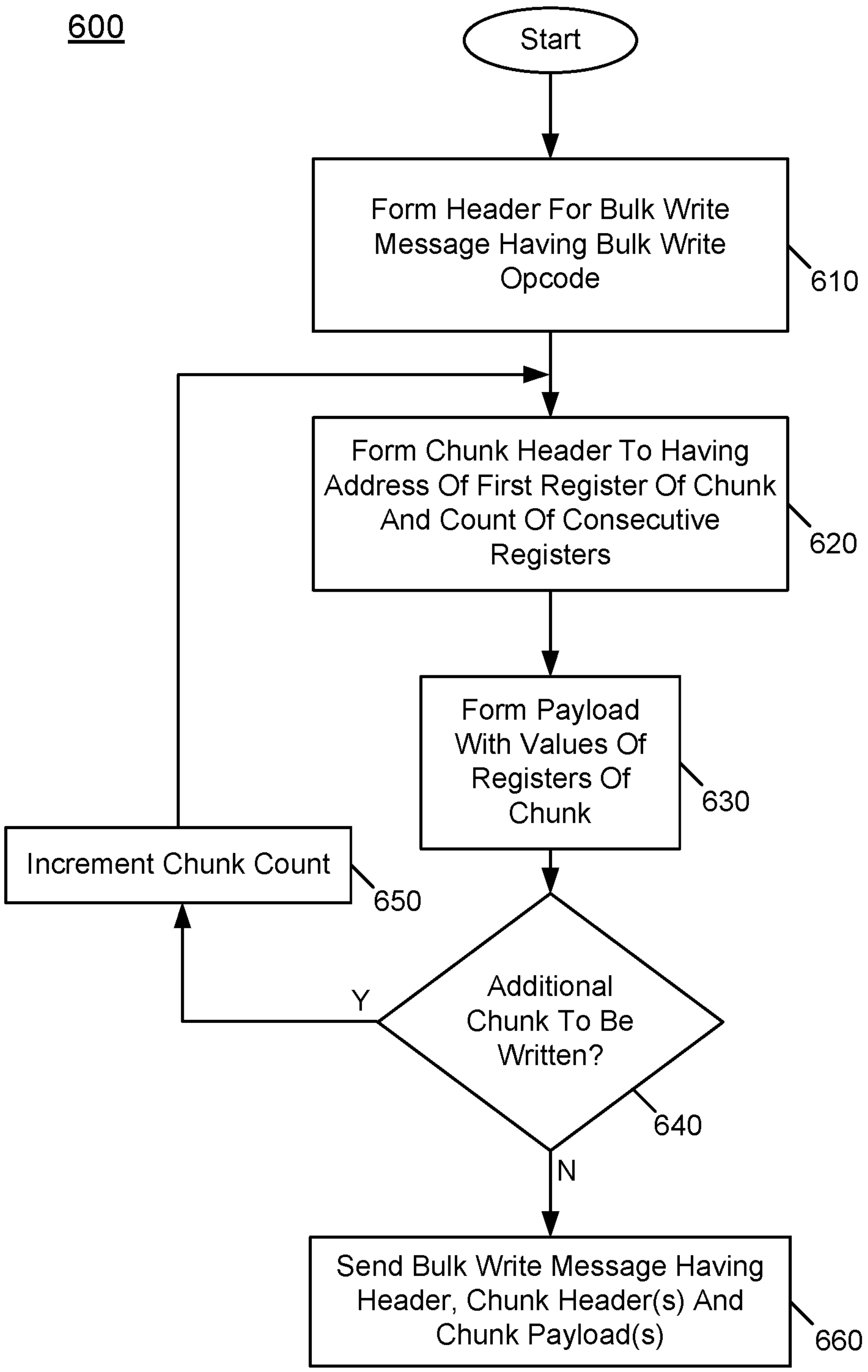
FIG. 6 is a flow diagram of a method in accordance with an embodiment of the present invention.

Referring now to FIG. 6, shown is a flow diagram of a method in accordance with an embodiment of the present invention. As shown in FIG. 6, method 600 is a method for generating and sending a bulk write message by a transmitter. Such transmitter may be any given agent of a processor or other SoC to seek to write multiple non-consecutive register values to a given destination. In various embodiments, method 600 may be performed by hardware circuitry, firmware, software and/or combinations thereof. As an example, the transmitter may be an agent that is to send a full context of an agent, e.g., to a destination agent for loading such values, e.g., upon initialization or after exit from a low power state. In other cases, an agent may send a bulk write message when it seeks to send its context to a destination, e.g., a given storage.

In any case, method 600 begins by forming a header for the bulk write message that has a bulk write opcode (block 610). This opcode may be of a predetermined value to identify that the message is a bulk write message. Additional information may be present in the message header, including a destination identifier, a source identifier, security information and so forth. In some cases, the message header may include a base header and an expanded header. The base header may be formed of a double word and the expanded header also may be formed as a double word. Of course other sizes and formats for the header are possible. The expanded header may include additional information associated with the bulk write message, such as security information, e.g., security attributes of the initiator (SAI).

Next, control passes to block 620 where a chunk header may be formed for a first chunk, namely a first set or chunk of consecutive registers to which values are to be written. This chunk header may include various information, including a base address corresponding to the address of the first register of the chunk of consecutive registers, and a length value to identify a count of the number of consecutive registers of the chunk. This count may, in one embodiment, take the form of a value corresponding to the total width of the registers of the chunk (e.g., in terms of double words). In an embodiment, this chunk header may be a double word, although other implementations are possible. And note that this chunk header is part of the payload of the bulk write message, and not of the message header itself.

Next, control passes to block 630 where a payload may be formed with the values of the registers of the chunk. In one particular embodiment, the registers may be 32-bit registers, such that the chunk payload may include N double words, where N is the number of consecutive registers in the chunk.

Still with reference to FIG. 6, next is determined whether there is an additional chunk to be written (diamond 640). If so, at block 650 the chunk count, namely the number of separate chunks each including one or more consecutive registers, is incremented, and control passes back to block 620.

Instead when it is determined that there are no further chunks to be written in the bulk write message, control passes to block 660. At block 660, the bulk write message may be sent. This message may include the header, the chunk headers and the chunk payloads. In an embodiment, this bulk write message may be sent from the source agent to a destination agent via a sideband interconnect system such as described herein. In one embodiment, the bulk write message may have the format shown in FIG. 16. By using an embodiment of the present invention, the overhead of sending values of multiple registers can be reduced, allowing higher effective bandwidths and faster latencies for entry into and exit from a low power state, as examples. Understand while shown at this high level in the embodiment of FIG. 6, many variations and alternatives are possible.

Figure 7:
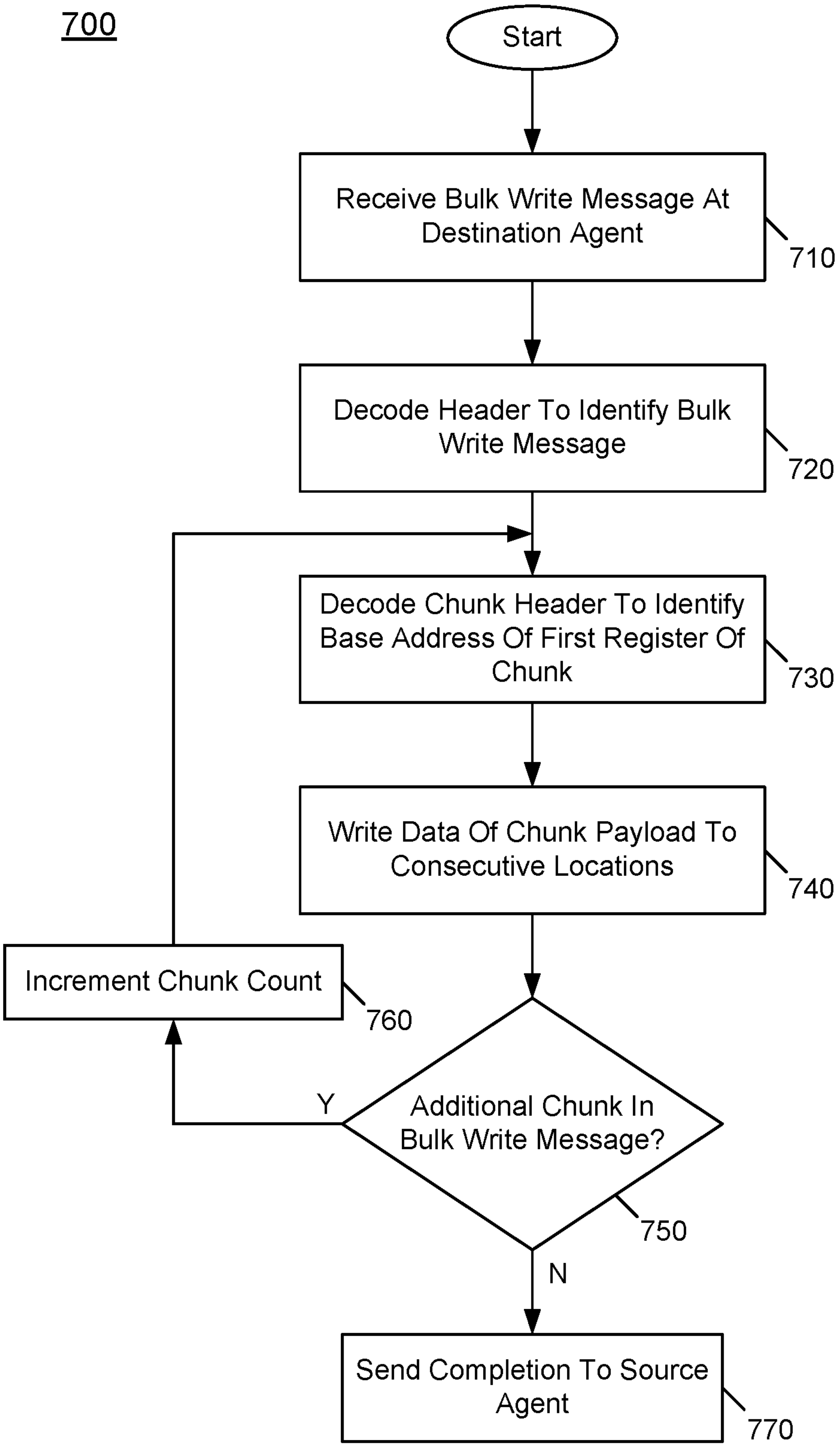
FIG. 7 is a flow diagram of a method in accordance with another embodiment of the present invention.

Referring now to FIG. 7, shown is a flow diagram of a method in accordance with another embodiment of the present invention. As shown in FIG. 7, method 700 is a method for receipt and processing of a bulk write message. In various embodiments, method 700 may be performed by hardware circuitry, firmware, software and/or combinations thereof.

As illustrated, method 700 may begin by receiving the bulk write message at the destination agent (block 710). As example, the destination agent may be a given processing circuit that is to store the information of the bulk write message in its local storage, e.g., registers. In other cases, the destination agent may be a storage device such as an on-chip memory to which a core's context is to be stored prior to entry into a low power state. In any case, at block 720 the header of the message is decoded to identify the message as a bulk write message type. As an example, the destination agent may parse an opcode in the header that identifies the message as the bulk write message.

Still with reference to FIG. 7, control next passes to block 730 where a chunk header is decoded to identify a base address of the first register of the chunk. Namely, this base address is an addressable location of the first register to be written within this chunk. Next control passes to block 740 where the data of the chunk payload may be written to consecutive locations. For example, in the case of writing of a bulk write message to load context into a core, value data (e.g., a double word) in the chunk payload can be written to a given one of consecutive registers.

Still referring to FIG. 7, next is determined at diamond 750 whether there is an additional chunk present in the bulk write message. If so, the chunk count is incremented at block 760, and control passes back to block 730 for further decoding of the next chunk header. Instead if it is determined that all chunks in the message have been written to their destination locations, control passes to block 770 where a completion message may be sent to a source agent. In the case where the bulk write is performed successfully, this completion message indicates a successful completion of the bulk write message. Although shown at this high level in the embodiment of FIG. 7, many variations and alternatives are possible.

Figure 8:
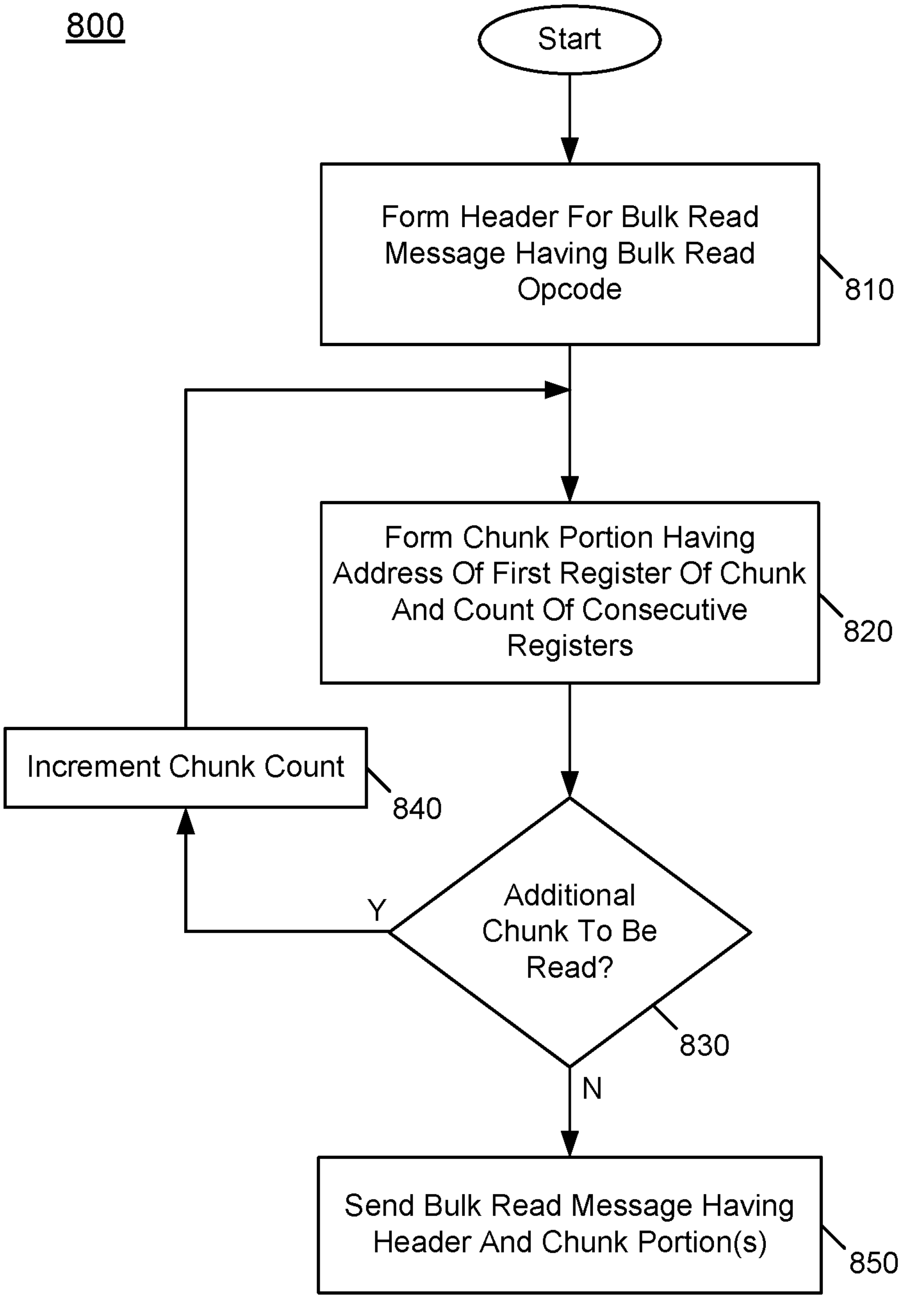
FIG. 8 is a flow diagram of a method in accordance with another embodiment of the present invention.

Referring now to FIG. 8, shown is a flow diagram of a method in accordance with another embodiment of the present invention. As shown in FIG. 8, method 800 is a method for generating and sending a bulk read message by a requester. In various embodiments, method 800 may be performed by hardware circuitry, firmware, software and/or combinations thereof. Such requester may be any given agent of a processor or other SoC to seek to read multiple non-consecutive register values from a given target. As an example, the requester may be an agent that is to receive context. In other cases, an agent may send a bulk read message when it seeks to read context of a target agent during a crash dump.

In any case, method 800 begins by forming a header for the bulk read message that has a bulk read opcode (block 810). This opcode may be of a predetermined value to identify that the message is a bulk read message. Additional information may be present in the header, as described above regarding bulk write messages.

Next, control passes to block 820 where a chunk portion is formed. This chunk portion for a first chunk may include various information, including a base address corresponding to the address of the first register of the chunk of consecutive registers, and a length value to identify a count of the number of consecutive registers of the chunk.

Still with reference to FIG. 8, next is determined whether there is an additional chunk to be read (diamond 830). If so, at block 840 the chunk count is incremented, and control passes back to block 820.

Instead when it is determined that there are no further chunks to be read, control passes to block 850 where the bulk read message may be sent. This message includes the header and chunk portions. In an embodiment, this bulk read message may be sent from the source agent to a target agent via a sideband interconnect system such as described herein. In one embodiment, the bulk read message may have the format shown in FIG. 17.

Understand while shown at this high level in the embodiment of FIG. 8, many variations and alternatives are possible.

Figure 9:
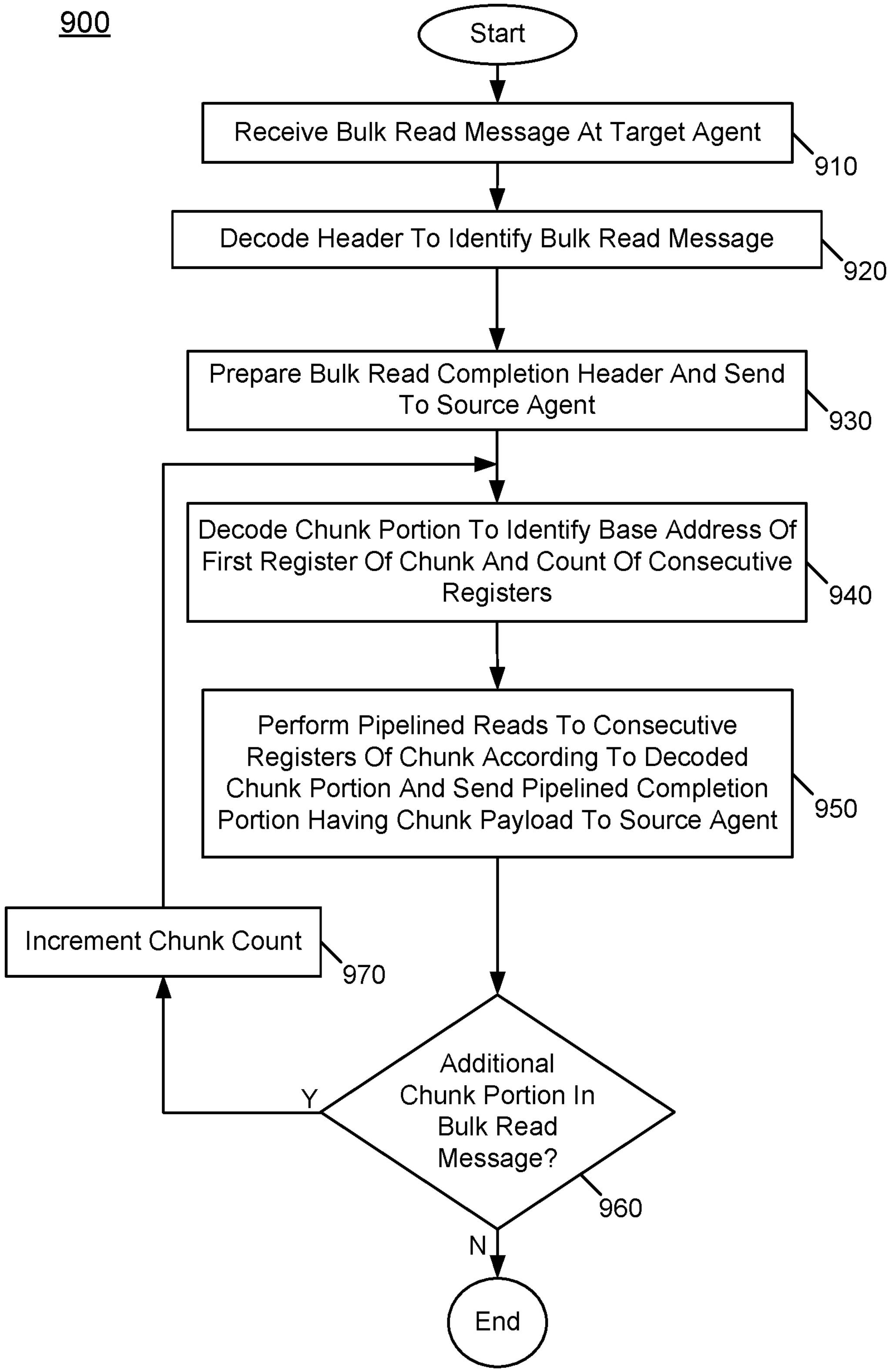
FIG. 9 is a flow diagram of a method in accordance with yet another embodiment of the present invention.

Referring now to FIG. 9, shown is a flow diagram of a method in accordance with yet another embodiment of the present invention. As shown in FIG. 9, method 900 is a method for receipt and processing of a bulk read message by a target agent. In various embodiments, method 900 may be performed by hardware circuitry, firmware, software and/or combinations thereof.

As illustrated, method 900 may begin by receiving the bulk read message at the target agent (block 910). As example, the target agent may be a given processing circuit that is to provide information requested by the bulk read message. At block 920 the header of the message is decoded to identify the message as a bulk read message type, e.g., based on an opcode.

Still with reference to FIG. 9, control next passes to block 930 where a bulk read completion header may be prepared and sent to the source agent. Then at block 940, a chunk portion is decoded to identify a base address of the first register of the chunk and the number of consecutive registers in the chunk to be read. Note it is possible for a different ordering to exist such that the bulk read completion header is not sent until first read data is ready to send.

In any event, at block 950, pipelined reads may be performed, e.g., by an endpoint logic of the target agent that decodes the bulk read message, and issues individual register reads to the registers of the chunk to obtain the register contents and pack them together as a single completion with the data. Since this is done in a pipelined way, the endpoint logic pushes a read each cycle and within a short latency it starts to get a completion double word (Dword) each cycle (in the absence of backpressure). Still further at block 950, this endpoint logic also begins sending completion data (Dwords) to the source agent having the chunk payload. With this pipeline of reads into the target agent and the completions out of the target agent, the protocol supports cycles where no data is pushed out due to the initial latency or any backpressure that stalls arrival of Dword completions to be sent out.

Still referring to FIG. 9, next is determined at diamond 950 whether there is an additional chunk portion present in the bulk read message. If so, the chunk count is incremented at block 970, and control passes back to block 940 for further decoding of the next chunk portion. Instead if it is determined that all of chunk portions have been read and completion data sent, the method ends. In the case where the bulk read is successful, the completion message includes a bulk read completion header and chunk payloads for each of the requested chunk portions. In an embodiment, a completion for a bulk read message may have the format of Table 3. Although shown at this high level in the embodiment of FIG. 9, many variations and alternatives are possible.

TABLE 3

| DW | L7 | L6 | L5 | L4 | L3 | L2 | L1 | L0 |
|---|---|---|---|---|---|---|---|---|
| Msg Header 0 | Destination ID | | | | | | | |
| | Source ID | | | | | | | |
| | Opcode = 8'h21 | | | | | | | |
| | EH = 1 | Reserved | | rsp | | | tag | |
| Msg Header 1 | EH = 0 | ExpHdrID = 7'h00 | | | | | | |
| | SAI[7:0] | | | | | | | |
| | Reserved | | | | | | | |
| | | Reserved | | | | RS | | |
| Chunk 0 Payload DW 0 | data byte <wbr>[7:0] | | | | | | | |
| | data byte <wbr>[15:8] | | | | | | | |
| | data byte <wbr>[23:16] | | | | | | | |
| | data byte <wbr>[31:24] | | | | | | | |
| Chunk 0 Payload DW 1 | data byte <wbr>[7:0] | | | | | | | |
| | data byte <wbr>[15:8] | | | | | | | |
| | data byte <wbr>[23:16] | | | | | | | |
| | data byte <wbr>[31:24] | | | | | | | |
| . . . | . . . | | | | | | | |
| Chunk M Payload DW 0 | data byte <wbr>[7:0] | | | | | | | |
| | data byte <wbr>[15:8] | | | | | | | |
| | data byte <wbr>[23:16] | | | | | | | |
| | data byte <wbr>[31:24] | | | | | | | |
| . . . | . . . | | | | | | | |
| Chunk M Payload DW N | data byte <wbr>[N32 + 7:N32] | | | | | | | |
| | data byte <wbr>[N32 + 15:N32 + 8] | | | | | | | |
| | data byte <wbr>[N32 + 23:N32 + 16] | | | | | | | |
| | data byte <wbr>[N32 + 31:N32 + 24] | | | | | | | |

In some scenarios, for error handling an indication as to whether any of the register accesses failed may be reported. Embodiments define a way to respond and allow the initiator to know if any failures occurred on the parsed register accesses. For bulk reads, special handling may occur since the error indication at the packet header is sent before most of the parsed reads are even started. On a bulk write, the message is sent non-posted. The destination IP can inform on any un-successful register write that was generated from the bulk write by setting an unsuccessful response status in the completion message. Bulk read messages are non-posted, so if the entire bulk message is unclaimed by the destination, an unsuccessful response status is sent in a completion without data. If the bulk read message is claimed, the response is a successful completion with data. Erroneous or unsuccessful read accesses (i.e., non-accessible or non-implemented registers) generated from the bulk read at the destination may be handled as follows: if the unsuccessful read access occurs before the last register access, the completion message is cut short and terminates with the remaining registers data. The message's remaining requests will be ignored; if the last register access of a bulk-read message is unsuccessful, the completion message is extended to contain one extra DWord of bogus data. To summarize, any message length that deviates from the expected message size may be considered as an error indication for a bulk read completion.

Figure 10:
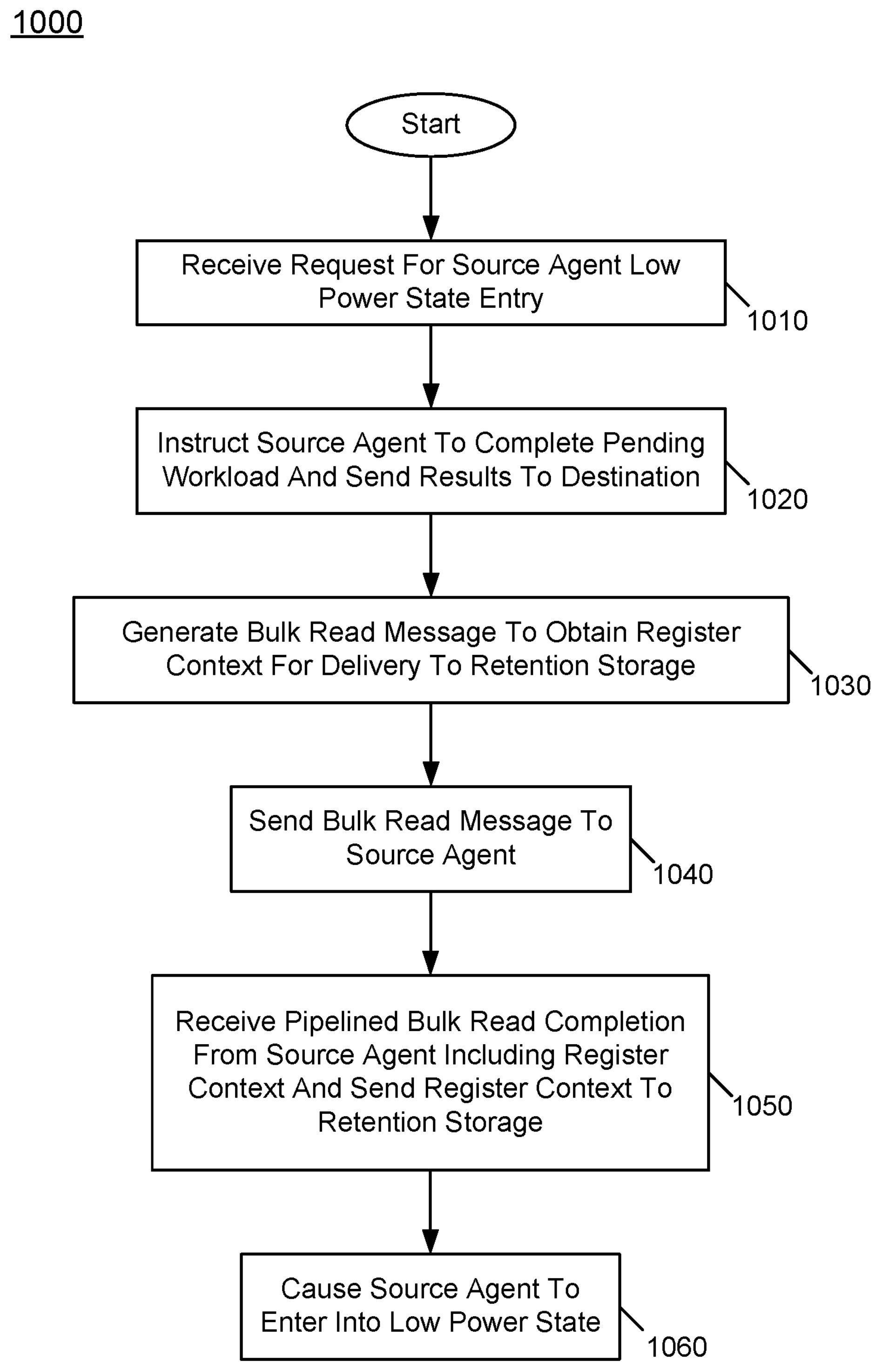
FIG. 10 is a flow diagram of a method in accordance with yet another embodiment of the present invention.

Referring now to FIG. 10, shown is a flow diagram of a method in accordance with yet another embodiment of the present invention. More specifically, method 1000 shown in FIG. 10 is a method for controlling, via a power management agent, a given source agent to enter into a low power state. In various embodiments, method 1000 may be performed by hardware circuitry, firmware, software and/or combinations thereof. In one embodiment, the power management agent may be one of multiple distributed power management agents associated with a collection of cores or other processing units. In turn, the power management agent may be in communication with a power controller of the SoC, such as a PCU.

As illustrated, method 1000 begins by receiving a request for a given source agent to enter into a low power state (block 1010). For example, this low power state request may be for a given core to enter into a deep low power state in which its context is to be sent to a retention storage prior to entry into the low power state. To enable this low power state entry to occur with reduced latency, embodiments may leverage a bulk read message protocol to quickly obtain the complete context of the core prior to its entry into the low power state.

As illustrated in FIG. 10, in response to this low power state request, control passes to block 1020, where the power management agent may instruct the source agent to complete a pending workload and send results to a destination, such as a given cache hierarchy. Prior to the core entering into the low power state, at block 1030 the power management agent generates a bulk read message to request the source agent to provide its context by way of a bulk read, so that the information can be delivered to a retention storage. More specifically, the power management agent may generate a bulk read message to obtain the register context from the core, for delivery to a given retention storage.

Still referencing FIG. 10, next at block 1040, the power management agent sends the bulk read message to the source agent. In response to this request message, the power management agent, at a block 1050, receives the register context from the source agent, e.g., by way of a completion message, namely a completion to the bulk read message, having the register contents in a pipelined manner. And as the register context is received, the power management agent sends the register context to the retention storage (block 1060). In one embodiment, this retention stored may be an on-chip storage, such as a so-called C6 static random access memory (SRAM). Thereafter, the power management agent may cause the source agent to enter into the desired low power state (block 1060). Note that with an embodiment as in FIG. 10, this context storage to a retention memory may occur with reduced latency as compared to individual register reads to obtain the core state. As such, a greatly reduced latency for entry into a low power state may be realized. Understand while shown at this high level in the embodiment of FIG. 10, many variations and alternatives are possible.

Figure 11:
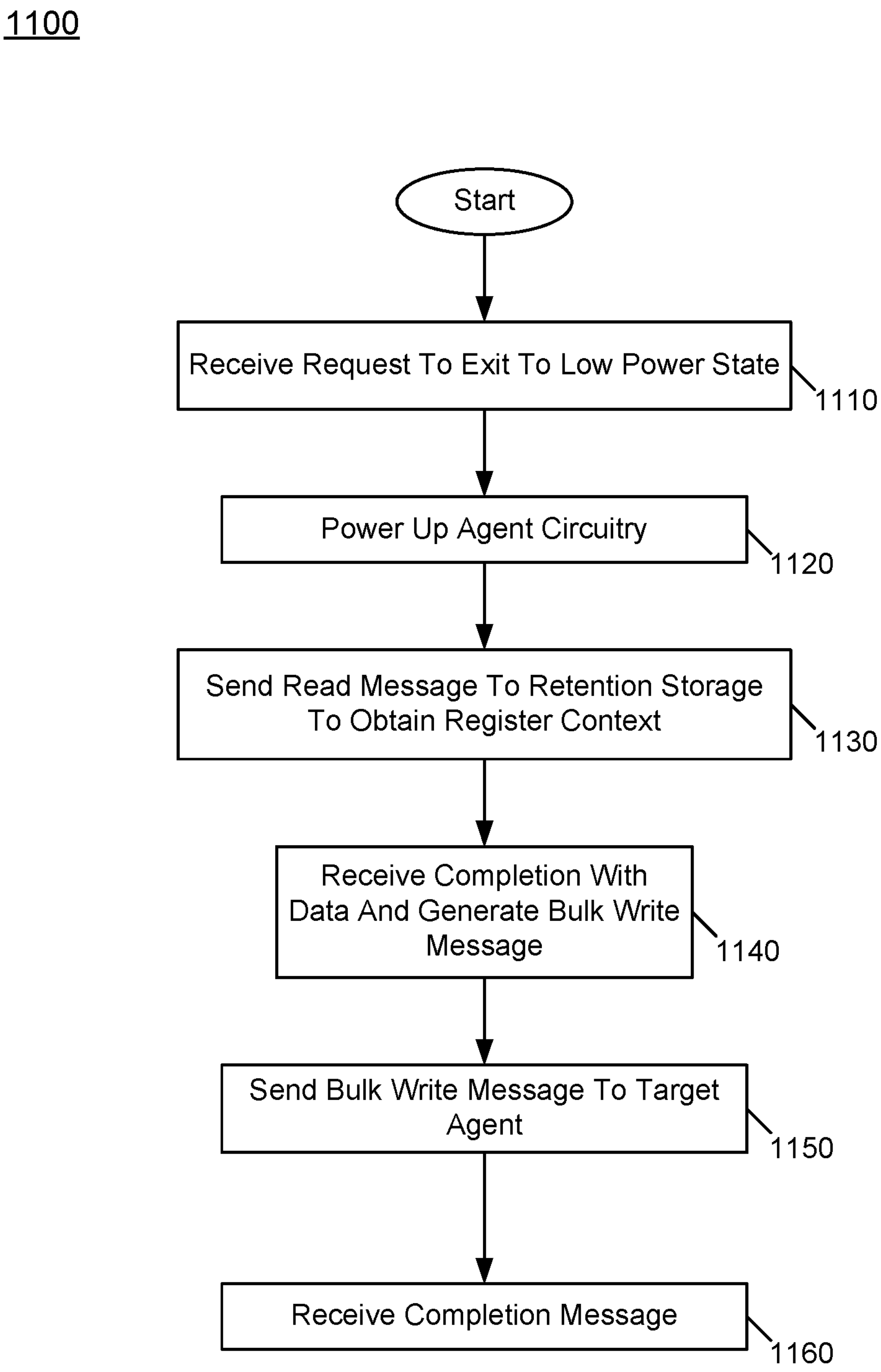
FIG. 11 is a flow diagram of a method in accordance with yet another embodiment of the present invention.

Referring now to FIG. 11, shown is a flow diagram of a method in accordance with yet another embodiment of the present invention. More specifically, method 1100 shown in FIG. 11 is a method for controlling, via a power management agent, a given target agent to exit from a low power state. As illustrated, method 1100 begins by receiving a request for a given target agent to exit a low power state (block 1110). To enable this low power state exit to occur with reduced latency, embodiments may leverage a bulk write message protocol to quickly write the complete context of the core into registers of the core.

As illustrated in FIG. 11, in response to this low power state exit request, control passes to block 1120, where the power management agent may instruct the target agent to power up. Then at block 1130, the power management agent sends a read request to the retention storage to obtain the register context. Then at block 1140, the power management agent receives a completion with the data and generates a bulk write message to package the context for sending to the core. Thereafter at block 1150, the power management agent sends the bulk write message to the target agent.

Still with reference to FIG. 11, next at block 1160, the power management agent receives a completion to indicate successful completion of the bulk write, such that the target agent is ready to enter into normal operation, with reduced latency as realized herein. Understand while shown at this high level in the embodiment of FIG. 11, many variations and alternatives are possible.

Embodiments provide an efficiency improvement. In an embodiment the calculation used to determine data efficiency for write or responses to read is: Data Efficiency=(# of DWords to be written)/(total # of DWords sent over the fabric). Read response efficiency of a single register read completion is fixed at 33%. In comparison, the efficiency of a completion to a bulk read is ~100% (nearer to 100% the larger the number of DWords sent). Write efficiency for a single register write message is fixed at 25%. In comparison, the theoretical efficiency of bulk write messages depends on how many chunks of addresses an IP has: IPs that have a single chunk of consecutive DWords have an efficiency that is close to 100%; and IPs that have a very fragmented register space have an efficiency that is close to 50%. With an embodiment, the average bulk write efficiency over all the IPs' registers may provide a 77% increase over performance of a single register write access. This efficiency can be increased to ~90% if IPs have consolidated registers. In an embodiment of a sideband full duplex fabric, read requests and read completions can be sent concurrently. This means that for reads, the throughput limitation is the worst between the read request and the read completion. The calculation used to determine efficiency of read requests is: read request efficiency=(# of registers in the message)/(total # of DWords sent over the fabric). A single register read request has a fixed efficiency of 33%. In comparison, the efficiency of a bulk-read is the same as bulk write in the range of 50%-100%. Bulk read efficiency may be identical to bulk write at approximately 77%, realizing a 2× performance as compared to a single register read access.

Figure 12:
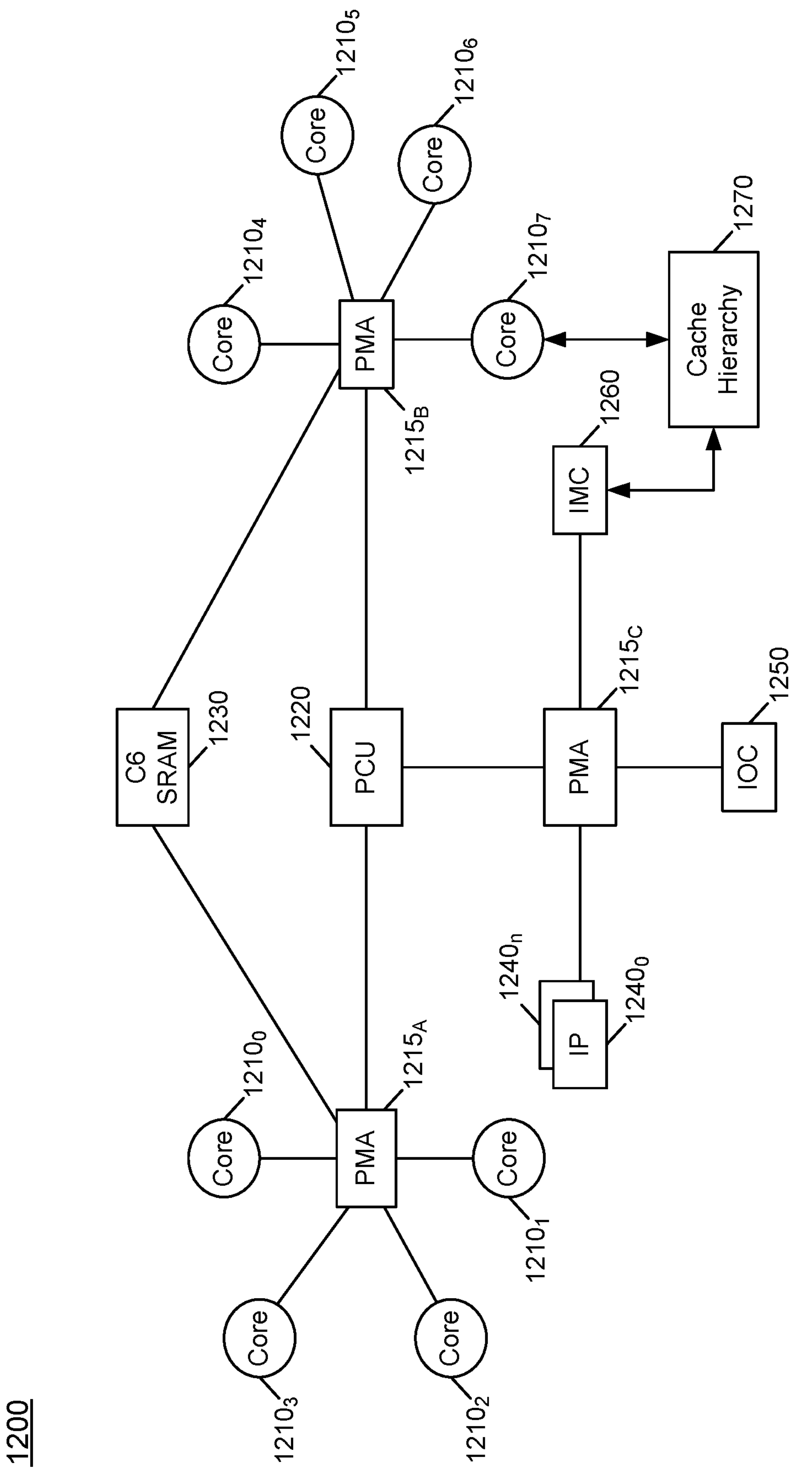
FIG. 12 is a block diagram of a system on chip in accordance with an embodiment of the present invention.

Referring now to FIG. 12, shown is a block diagram of a system on chip in accordance with an embodiment of the present invention. As shown in FIG. 12, SoC 1200 includes a variety of different agents coupled together the multiple fabrics, including a primary scalable fabric and a sideband interconnect system such as described herein.

In the high level shown in FIG. 12, multiple core domains are present, each including a plurality of cores ($\mathbf{1210}_0$-$\mathbf{1210}_3$ and $\mathbf{1210}_4$-$\mathbf{1210}_7$) with each core of a given domain coupled to one of multiple distributed power management agents (PMAs) $\mathbf{1215}_a$-$\mathbf{1215}_b$.

In embodiments, PMAs 1215 may in turn couple to a PCU 1220, which acts as a main power controller of SoC 1200. As such, in response to requests and/or operating conditions within SoC 1200, PCU 1220 may send commands to corresponding PMAs 1215 to request particular cores 1210 (or other processing circuitry) to enter into or exit power states. As such, PMAs 1215 may be configured to issue bulk read and write messages as described herein to efficiently and with low latency obtain context of a given core and provide it for storage in a C6 SRAM 1230. To this end, note that both PMAs 1215, cores 1210, and other components may include input/output circuits, ports, interfaces or so forth, including bulk read and write circuitry to generate, send, receive and handle bulk read and write messages (and associated completions) as described herein.

As further illustrated in FIG. 12, PMA $\mathbf{1215}_c$ may further couple to additional agents of SoC 1200 including IP circuits $1240_0$-$1240_n$, which in different implementations may be graphics processing units, specialized function units third party intellectual property circuits or so forth. In addition, PMA $1215_c$ further is coupled to an integrated memory controller 1260 and input output circuit 1250.

Note that at the high level shown in FIG. 12, only a single core $1210_7$ is coupled to a cache hierarchy 1270. Understand that that this coupling is for illustrative purposes only; and all cores 1210 may couple to the cache hierarchy. Understand while shown at this high level in the embodiment of FIG. 12, many variations and alternatives are possible. For example, FIG. 12 illustrates sideband communications for purposes of low latency low power state entries and exits as described herein. Understand that various components also may couple to each other by a primary scalable fabric (not shown for ease of illustration in FIG. 12).

Figure 13:
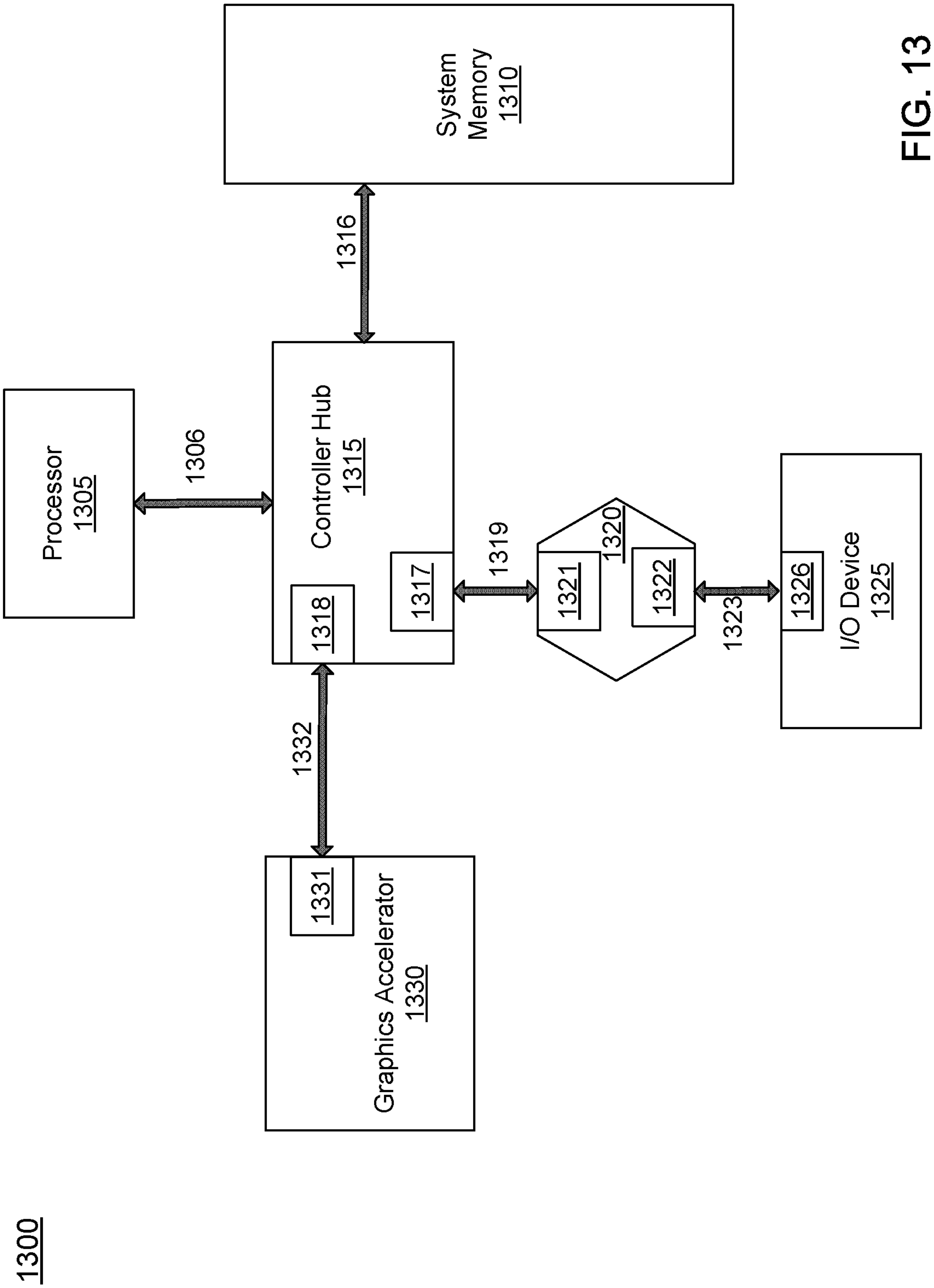
FIG. 13 is an embodiment of a fabric composed of point-to-point links that interconnect a set of components.

Embodiments may be implemented in a wide variety of systems. Referring to FIG. 13, an embodiment of a fabric composed of point-to-point links that interconnect a set of components is illustrated. System 1300 includes processor 1305 and system memory 1310 coupled to a controller hub 1315. Processor 1305 includes any processing element, such as a microprocessor, a host processor, an embedded processor, a co-processor, or other processor. Processor 1305 is coupled to controller hub 1315 through front-side bus (FSB) 1306. In one embodiment, FSB 1306 is a serial point-to-point interconnect. In an embodiment, where processor 1305 and controller hub 1315 are implemented on a common semiconductor die, bus 1306 may be implemented as an on-die interconnect. In yet another implementation where processor 1305 and controller hub 1315 are implemented as separate die within a multi-chip package, bus 1306 can be implemented as an intra-die interconnect.

System memory 1310 includes any memory device, such as random access memory (RAM), non-volatile (NV) memory, or other memory accessible by devices in system 1300. System memory 1310 is coupled to controller hub 1315 through memory interface 1316. Examples of a memory interface include a double-data rate (DDR) memory interface, a dual-channel DDR memory interface, and a dynamic RAM (DRAM) memory interface.

In one embodiment, controller hub 1315 is a root hub, root complex, or root controller in a PCIe interconnection hierarchy. Examples of controller hub 1315 include a chip set, a peripheral controller hub (PCH), a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 1305, while controller 1315 is to communicate with I/O devices, in a similar manner as described below. In some embodiments, peer-to-peer routing is optionally supported through root complex 1315.

Here, controller hub 1315 is coupled to switch/bridge 1320 through serial link 1319. Input/output modules 1317 and 1321, which may also be referred to as interfaces/ports 1317 and 1321, include/implement a layered protocol stack to provide communication between controller hub 1315 and switch 1320. In one embodiment, multiple devices are capable of being coupled to switch 1320.

Switch/bridge 1320 is coupled to an I/O device 13235 through link 1323 and input/output modules 1322 and 1326, to route packets/messages from device 1325 upstream, i.e., up a hierarchy towards a root complex, to controller hub 1315 and downstream, i.e., down a hierarchy away from a root controller, from processor 1305 or system memory 1310 to device 1325. Switch 1320, in one embodiment, is referred to as a logical assembly of multiple virtual PCI-to-PCI bridge devices. Device 1325 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 1325 may include a PCIe to PCI/PCI-X bridge to support legacy or other version PCI devices. Endpoint devices in PCIe are often classified as legacy, PCIe, or root complex integrated endpoints.

Graphics accelerator 1330 is also coupled to controller hub 1315 through serial link 1332. In one embodiment, graphics accelerator 1330 is coupled to an MCH, which is coupled to an ICH. Switch 1320, and accordingly I/O device 1325, is then coupled to the ICH. I/O modules 1331 and 1318 are also to implement a layered protocol stack to communicate between graphics accelerator 1330 and controller hub 1315. A graphics controller or the graphics accelerator 1330 itself may be integrated in processor 1305. Understand that any of the components shown in FIG. 13 may leverage bulk read and write messages in accordance with an embodiment.

Figure 14:
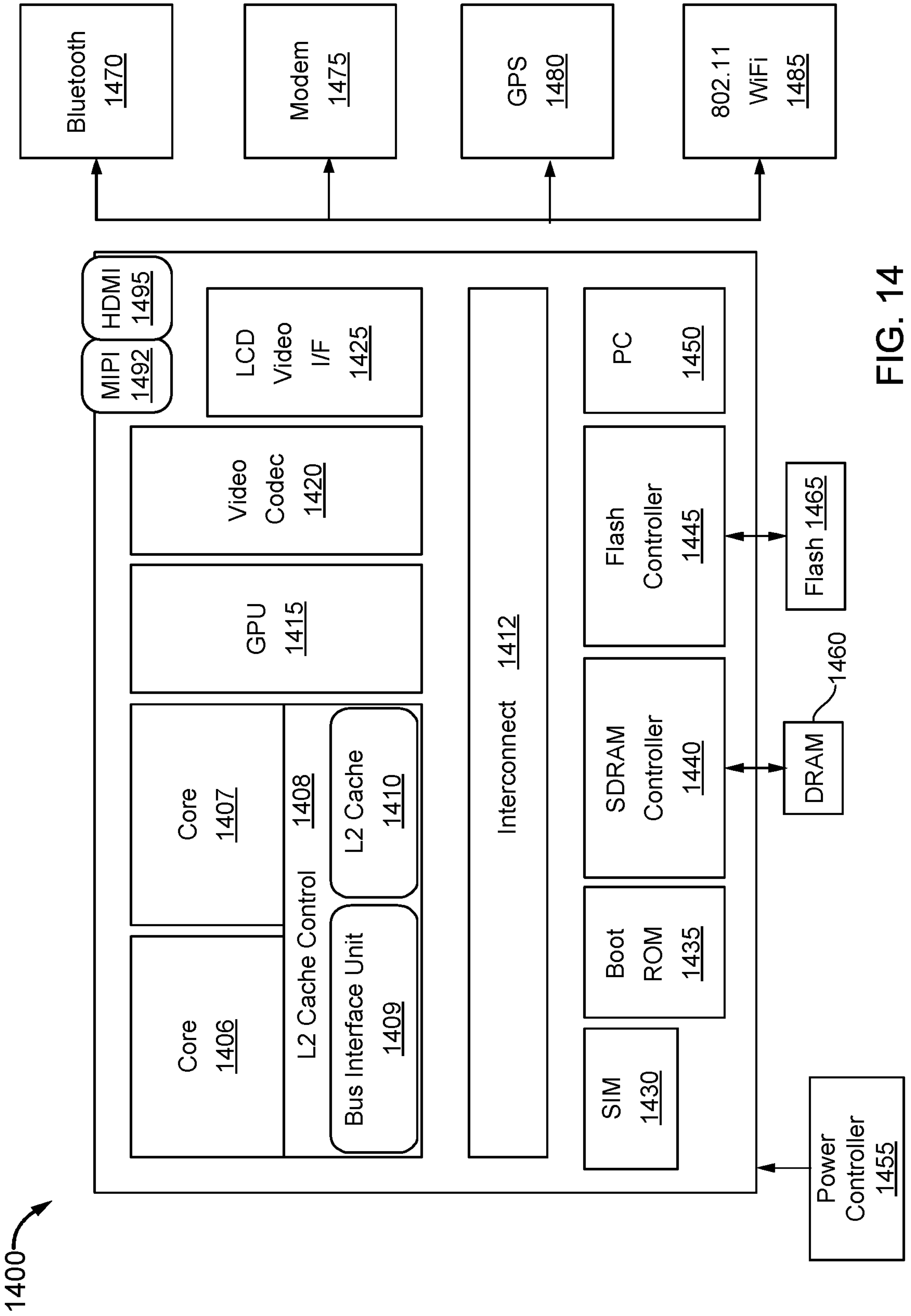
FIG. 14 is an embodiment of a system-on-chip design in accordance with an embodiment.

Turning next to FIG. 14, an embodiment of a SoC design in accordance with an embodiment is depicted. As a specific illustrative example, SoC 1400 may be configured for insertion in any type of computing device, ranging from portable device to server system. Here, SoC 1400 includes 2 cores 1406 and 1407. Cores 1406 and 1407 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of system 1400 via an interconnect 1412.

Interconnect 1412 provides communication channels to the other components, such as a Subscriber Identity Module (SIM) 1430 to interface with a SIM card, a boot ROM 1435 to hold boot code for execution by cores 1406 and 1407 to initialize and boot SoC 1400, a SDRAM controller 1440 to interface with external memory (e.g., DRAM 1460), a flash controller 1445 to interface with non-volatile memory (e.g., flash memory 1465), a peripheral controller 1450 (e.g., via an eSPI interface) to interface with peripherals, such as an embedded controller 1490.

Still referring to FIG. 14, system 1400 further includes video codec 1420 and video interface 1425 to display and receive input (e.g., touch enabled input), GPU 1415 to perform graphics related computations, etc. In addition, the system illustrates peripherals for communication, such as a Bluetooth module 1470, 3G modem 1475, GPS 1480, and WiFi 1485. Also included in the system is a power controller 1455 which may trigger low power state entry/exits that leverage bulk read and write messages in accordance with an embodiment. Further illustrated in FIG. 14, system 1400 may additionally include interfaces including a MIPI interface 1492 and/or an HDMI interface 1495 which may couple to a display.

Figure 15:
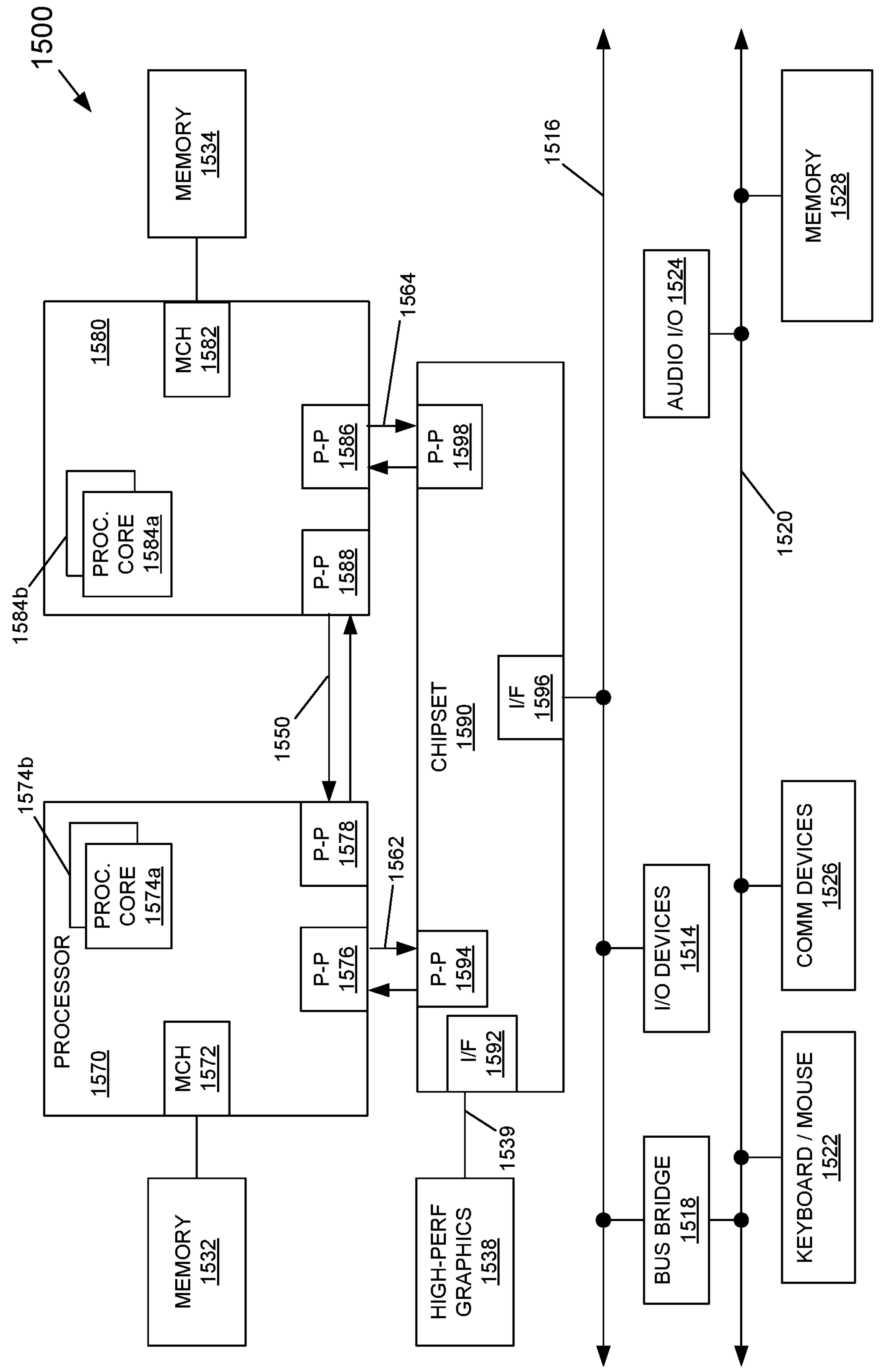
FIG. 15 is a block diagram of a system in accordance with an embodiment of the present invention.

Referring now to FIG. 15, shown is a block diagram of a system in accordance with an embodiment of the present invention. As shown in FIG. 15, multiprocessor system 1500 includes a first processor 1570 and a second processor 1580 coupled via a point-to-point interconnect 1550. As shown in FIG. 15, each of processors 1570 and 1580 may be many core processors including representative first and second processor cores (i.e., processor cores 1574*a* and 1574*b* and processor cores 1584*a* and 1584*b*). The processors may include a power controller to trigger low power state entry/exits that leverage bulk read and write messages in accordance with an embodiment.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a memory 1528. Further, an audio I/O 1524 may be coupled to second bus 1520.

The following examples pertain to further embodiments.

In one example, a processor includes a first agent comprising: a processing circuit to execute instructions; and an input/output circuit coupled to the processing circuit, the input/output circuit including a bulk write circuit to generate a bulk write message to send to a destination agent to cause the destination agent to write data comprising register contents into a plurality of registers, at least some of the plurality of registers comprising non-consecutive registers, the bulk write message including a first message header, a first chunk header including an address of a first register of a first subset of the plurality of registers, and a first payload portion having the register contents for the first subset of the plurality of registers.

In an example, the bulk write message further includes a second chunk header including an address of a first register of a second subset of the plurality of registers, and a second payload portion having the register contents for the second subset of the plurality of registers.

In an example, the first chunk header further includes an indication of the number of registers in the first subset of the plurality of registers.

In an example, the first message header comprises a first opcode to identify the bulk write message, the first opcode different than a second opcode to identify a write message.

In an example, the first message header comprises a first header and an expanded header, the expanded header including security information.

In an example, the input/output circuit further includes a bulk read circuit to generate a bulk read message to send to a target agent, to cause the target agent to send read data comprising register contents of a plurality of second registers of the target agent, at least some of the plurality of second registers comprising non-consecutive registers.

In an example, the bulk read message includes a second message header and a plurality of chunk portions, each of the plurality of chunk portions including an address to identify a first register of a subset of the plurality of second registers and an indication of a count of consecutive registers of the chunk portion.

In an example, the first agent comprises a power management agent coupled to a plurality of cores, the power management agent to send the bulk read message to a first core to cause the first core to provide the read data comprising a context of the first core to the power management agent prior to entry of the first core into a low power state.

In an example, the power management agent is to send the bulk write message to the first core to cause the first core to write the register contents into the plurality of registers of the first core when the first core is to exit the low power state.

In an example, the input/output circuit is to send the bulk write message having a data efficiency of at least 50%.

In an example, the input/output circuit is to send the bulk write message to the destination agent via a sideband interconnect.

In another example, a method comprises: receiving, in a power management agent of a SoC, a request for a first core of the SoC to enter into a low power state; in response to the request, generating a bulk read message to obtain a context of the first core from a plurality of registers of the first core, at least some of the plurality of registers comprising non-consecutive registers, the bulk read message including a message header and a plurality of chunk portions, each of the plurality of chunk portions including an address to identify a first register of a subset of the plurality of registers and an indication of a count of consecutive registers of the chunk portion; sending the bulk read message to the first core; receiving a completion for the bulk read message, the completion including the context of the first core; storing the context of the first core in a retention storage of the processor; and enabling the first core to enter into the low power state.

In an example, the method further comprises: receiving, in the power management agent, a request for the first core to exit the low power state; in response to the request, causing the first core to power up; obtaining the context of the first core from the retention storage; generating a bulk write message to write the context of the first core to the first core; and sending the bulk write message to the first core to enable the first core to store the context of the first core in the plurality of registers of the first core.

In an example, the method further comprises sending the bulk write message including a second header, a first chunk header including an address of a first register of a first subset of the plurality of registers, and a first payload portion having the register contents for the first subset of the plurality of registers.

In an example, the method further comprises: receiving the request for the low power state entry in the power management agent from a power controller of the processor; sending the bulk read message to the first core via a sideband interconnect; and receiving the completion for the bulk read message via the sideband interconnect.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes an SoC and a dynamic random access memory coupled to the SoC. The SoC includes: a first plurality of cores to execute instructions; a first power management agent coupled to the first plurality of cores to provide distributed power control to the first plurality of cores; and a power controller coupled to the first power management agent to instruct the first power management agent to cause a first core of the first plurality of cores to enter into a low power state. The first power management agent may be configured to: send a bulk read message to the first core to obtain a context of the first core from a plurality of registers of the first core, at least some of the plurality of registers comprising non-consecutive registers, the bulk read message including a message header and a plurality of chunk portions, each of the plurality of chunk portions including an address to identify a first register of a subset of the plurality of registers and an indication of a count of consecutive registers of the chunk portion; and receive a completion for the bulk read message, the completion including the context of the first core, and thereafter cause the first core to enter into the low power state.

In an example, the SoC further comprises a static random access memory, and the first power management agent is to store the context of the first core in the static random access memory.

In an example, the power controller is to instruct the first power management agent to cause the first core to exit the low power state, where in response to the instruction from the power controller, the first power management agent is to obtain the context of the first core from the static random access memory.

In an example, the first power management agent is to send a bulk write message to the first core to cause the first core to write the context of the first core to the plurality of registers, the bulk write message including a second header, a first chunk header including an address of a first register of a first subset of the plurality of registers, and a first payload portion having the register contents for the first subset of the plurality of registers.

In an example, the SoC further comprises a sideband interconnect, where the first core and the first power management agent are coupled via the sideband interconnect.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:

a first agent comprising a power management agent coupled to a plurality of cores, the power management agent comprising:

a processing circuit to execute instructions; and an input/output circuit coupled to the processing circuit, the input/output circuit including a bulk write circuit to generate a bulk write message to send to a destination agent comprising a first core to cause the destination agent to write data comprising register contents into a plurality of registers when the first core is to exit a low power state, at least some of the plurality of registers comprising non-consecutive registers, the bulk write message including a first message header, a first chunk header including an address of a first register of a first subset of the plurality of registers, and a first payload portion having the register contents for the first subset of the plurality of registers.

2. The processor of claim 1, wherein the bulk write message further includes a second chunk header including an address of a first register of a second subset of the plurality of registers, and a second payload portion having the register contents for the second subset of the plurality of registers.

3. The processor of claim 2, wherein the first chunk header further includes an indication of the number of registers in the first subset of the plurality of registers.

4. The processor of claim 1, wherein the first message header comprises a first opcode to identify the bulk write message, the first opcode different than a second opcode to identify a write message.

5. The processor of claim 4, wherein the first message header comprises a first header and an expanded header, the expanded header including security information.

6. The processor of claim 1, wherein the input/output circuit further includes a bulk read circuit to generate a bulk read message to send to a target agent, to cause the target agent to send read data comprising register contents of a plurality of second registers of the target agent, at least some of the plurality of second registers comprising non-consecutive registers.

7. The processor of claim 6, wherein the bulk read message includes a second message header and a plurality of chunk portions, each of the plurality of chunk portions including an address to identify a first register of a subset of the plurality of second registers and an indication of a count of consecutive registers of the chunk portion.

8. The processor of claim 7, wherein the power management agent is to send the bulk read message to the first core to cause the first core to provide the read data comprising a context of the first core to the power management agent prior to entry of the first core into the low power state.

9. The processor of claim 1, wherein the input/output circuit is to send the bulk write message having a data efficiency of at least 50%.

10. The processor of claim 1, wherein the input/output circuit is to send the bulk write message to the destination agent via a sideband interconnect.

11. A non-transitory machine-readable medium having stored thereon instructions, which if performed by a machine cause the machine to perform a method comprising:

receiving, in a power management agent of a system on chip (SoC), a request for a first core of the SoC to enter into a low power state;

in response to the request, generating a bulk read message to obtain a context of the first core from a plurality of registers of the first core, at least some of the plurality of registers comprising non-consecutive registers, the bulk read message including a message header and a plurality of chunk portions, each of the plurality of chunk portions including an address to identify a first register of a subset of the plurality of registers and an indication of a count of consecutive registers of the chunk portion;

sending the bulk read message to the first core;

receiving a completion for the bulk read message, the completion including the context of the first core;

storing the context of the first core in a retention storage of the SoC; and enabling the first core to enter into the low power state.

12. A non-transitory machine-readable medium of claim 11, wherein the method further comprises:

receiving, in the power management agent, a request for the first core to exit the low power state;

in response to the request, causing the first core to power up;

obtaining the context of the first core from the retention storage;

generating a bulk write message to write the context of the first core to the first core; and sending the bulk write message to the first core to enable the first core to store the context of the first core in the plurality of registers of the first core.

13. A non-transitory machine-readable medium of claim 12, wherein the method further comprises sending the bulk write message including a second header, a first chunk header including an address of a first register of a first subset of the plurality of registers, and a first payload portion having the register contents for the first subset of the plurality of registers.

14. A non-transitory machine-readable medium of claim 11, wherein the method further comprising:

receiving the request for the low power state entry in the power management agent from a power controller of the SoC;

sending the bulk read message to the first core via a sideband interconnect; and receiving the completion for the bulk read message via the sideband interconnect.

15. A system comprising:

a system on chip (SoC) comprising:

a first plurality of cores to execute instructions;

a first power management agent coupled to the first plurality of cores to provide distributed power control to the first plurality of cores; and a power controller coupled to the first power management agent to instruct the first power management agent to cause a first core of the first plurality of cores to enter into a low power state, wherein in response to the instruction from the power controller, the first power management agent is to:

send a bulk read message to the first core to obtain a context of the first core from a plurality of registers of the first core, at least some of the plurality of registers comprising non-consecutive registers, the bulk read message including a message header and a plurality of chunk portions, each of the plurality of chunk portions including an address to identify a first register of a subset of the plurality of registers and an indication of a count of consecutive registers of the chunk portion; and receive a completion for the bulk read message, the completion including the context of the first core, and thereafter cause the first core to enter into the low power state; and a dynamic random access memory coupled to the SoC.

16. The system of claim 15, wherein the SoC further comprises a static random access memory, and the first power management agent is to store the context of the first core in the static random access memory.

17. The system of claim 16, wherein the power controller is to instruct the first power management agent to cause the first core to exit the low power state, wherein in response to the instruction from the power controller, the first power management agent is to obtain the context of the first core from the static random access memory.

18. The system of claim 17, wherein the first power management agent is to send a bulk write message to the first core to cause the first core to write the context of the first core to the plurality of registers, the bulk write message including a second header, a first chunk header including an address of a first register of a first subset of the plurality of registers, and a first payload portion having the register contents for the first subset of the plurality of registers.

19. The system of claim 15, wherein the SoC further comprises a sideband interconnect, wherein the first core and the first power management agent are coupled via the sideband interconnect.

* * * * *